US007117366B2

(12) United States Patent
Vincent (10) Patent No.: US 7,117,366 B2
(45) Date of Patent: Oct. 3, 2006

(54) PUBLIC KEY BASED AUTHENTICATION METHOD FOR TRANSACTION DELEGATION IN SERVICE-BASED COMPUTING ENVIRONMENTS

(75) Inventor: Christopher R. Vincent, Arlington, MA (US)

(73) Assignee: International Business Machines Corporation, Armonk, NY (US)

( * ) Notice: Subject to any disclaimer, the term of this patent is extended or adjusted under 35 U.S.C. 154(b) by 868 days.

(21) Appl. No.: 10/042,639

(22) Filed: Jan. 8, 2002

(65) Prior Publication Data

US 2003/0131238 A1 Jul. 10, 2003

(51) Int. Cl.
*H04L 9/00* (2006.01)
(52) U.S. Cl. .......................... 713/176; 726/3; 713/181
(58) Field of Classification Search ............... 713/200, 713/176, 181; 726/3
See application file for complete search history.

(56) References Cited

U.S. PATENT DOCUMENTS

| | | | |
|---|---|---|---|
| 5,481,715 A | 1/1996 | Hamilton et al. | |
| 6,138,235 A | 10/2000 | Lipkin et al. | |
| 6,170,017 B1 | 1/2001 | Dias et al. | |
| 6,189,103 B1 | 2/2001 | Nevarez et al. | |
| 6,820,201 B1* | 11/2004 | Lincoln et al. | 713/179 |
| 6,895,507 B1* | 5/2005 | Teppler | 726/19 |
| 6,898,709 B1* | 5/2005 | Teppler | 713/178 |
| 2001/0046862 A1* | 11/2001 | Coppinger et al. | |
| 2003/0028773 A1* | 2/2003 | McGarvey et al. | |

OTHER PUBLICATIONS

"Cryptography and Data Security", Denning, 1982.*
Gasser et al. "An Architecture for Practical Delegation in a Distributed System", 1990 IEEE Computer Society Symposium, May 7-9, 1990, pp. 20-30.
Aura, Thomas, "Distributed Access-Rights Management with Delegation Certificates", Springer-Verlag, Secure Internet Programming, 1999, pp. 211-235.

* cited by examiner

*Primary Examiner*—Kambiz Zand
(74) *Attorney, Agent, or Firm*—Jon A. Gibbons; Fleit, Kain, Gibbons, Gutman, Bongini & Biance P.L.

(57) ABSTRACT

A system and method for allowing access to data or processing on a remote computer. An authorizing computer provides client computers with a data specification and remote computer address along with an authorization code that is digitally signed or encrypted and that may only be used for a limited number of times. A client computer then accesses the remote computer by providing the digitally signed authorization code. The remote computer responds with the data or processing if the digital signature is successfully verified and the authorization code has been used fewer than the limited number of times.

26 Claims, 8 Drawing Sheets

```
<SOAP -ENV:Envelope
    xmlns:SOAP-ENV="http://schemas.xmlsoap.org/soap/envelope/"
    xmlns:xsi="http://www.w3.org/1999/XMLSchema-instance"
    xmlns:xsd="http://www.w3.org/1999/XMLSchema"
    SOAP-ENV:encodingStyle="http://schemas.xmlsoap.org/soap/encoding/">

<SOAP-ENV:Body>

<m:getAvailability
    xmlns:m="urn:warehouse-management" SOAP-
    ENV:encodingStyle="http://schemas.xmlsoap.org/soap/encoding/">

<nonce xsi:type="xsd:string">90283459872435790982439532457</nonce>

<product xsi:type="xsd:string">1SDFK213</product>

</m:getAvailability>

</SOAP -ENV:Body>

</SOAP-ENV:Envelope>
```

```
<SOAP-ENV:Envelope
    xmlns:SOAP -ENV="http://schemas.xmlsoap.org/soap/envelope/"
    SOAP-ENV:encodingS tyle="http://schemas.xmlsoap.org/soap/encoding/"/>

<SOAP -ENV:Body>

<m:getAvailabilityxmlns:m="   urn:warehouse-management   ">

<InStockCount>123</InStockCount>

</m:getAvailability>

</SOAP -ENV:Body>

</SOAP-ENV:Envelope>
```

PUBLIC KEY BASED AUTHENTICATION METHOD FOR TRANSACTION DELEGATION IN SERVICE-BASED COMPUTING ENVIRONMENTS

CROSS REFERENCE TO RELATED APPLICATIONS

In addition, the present application relates to technology similar to U.S. patent application Ser. No. 09/976,524, filed on Oct. 10, 2001, now entitled "SHARED AUTHORIZATION DATA AUTHENTICATION METHOD FOR TRANSACTION DELEGATION IN SERVICE-BASED COMPUTING ENVIRONMENTS" with inventor Christopher R. Vincent and commonly assigned herewith to International Business Machine, Corporation and which is hereby incorporated by reference in its entirety herein.

BACKGROUND OF THE INVENTION

1. Field of the Invention

This invention generally relates to the field of monitoring and controlling electronic access to data and processing on remote computers, and more particularly relates to providing one time access to processing on remote computers.

2. Description of Related Art

Many applications which operate on computers connected to electronic communications networks receive data from remote computers. The data received from remote computers may be provided by a data base server on the remote computer or by a process executing on the remote computer which produces the data. The remote computer may be used to distribute processing among different processors or the remote computer may be operated by a different business entity and provides the data under a contract or Service Level Agreement (SLA).

Requesting information from remote computers is often performed when assembling information to provide in a report. An example of automated report generation that often access data from remote computers is assembling information to transmit to a person using an Internet World Wide Web (WWW) browser. A person using a WWW Browser may request a set of information from a server computer and that server computer may request and receive data from a remote computer in order to assemble the complete set of information requested.

An example of an application that requires data to be retrieved from a remote computer is an Internet retailer that out sources warehouse management to another company. A customer requesting information over the Internet about a product might also be provided with the quantity of that product that is available in the retailer's warehouse. In order to determine the quantity of that product that is available in the warehouse, the retailer's computer, which receives the request from the customer, queries the computer maintained by the warehouse management company to determine the inventory on hand. The quantity information is then received by the retailer's computer and integrated into the information sent to the customer.

The data stored on the remote computers is often private or not available to the general public. In order to control access to that data, a user authentication system must be implemented. Various user authentication systems exist in the prior art which are based on the identity of a user's account or computer requesting the information. This limits the processing architecture of systems that provide information to a large base of users. Accordingly, a need exists for a method and system to provide selective access to private computer resources over a communications network.

SUMMARY OF THE INVENTION

According to an example embodiment of the present invention, a public key based authentication method for transaction delegation in service-based computing environments is a method for controlling communications access to remote processors which comprises accepting a request for a data item where the request contains a nonce value which has been digitally signed with a digital signature. Once the digitally signed nonce value is accepted, the method verifies the nonce value by verifying the digital signature. If the nonce value is verified, the method responds to the request by returning the data item if the nonce value is valid and has been previously used fewer than a limited number of times.

BRIEF DESCRIPTION OF THE DRAWINGS

The subject matter which is regarded as the invention is particularly pointed out and distinctly claimed in the claims at the conclusion of the specification. The foregoing and other features, and advantages of the invention will be apparent from the following detailed description taken in conjunction with the accompanying drawings. Additionally, the left-most digit of a reference number identifies the drawing in which the reference number first appears.

DESCRIPTION OF THE EXEMPLARY EMBODIMENTS

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

In the drawing like numerals refer to like parts through several views.

The present invention, according to a first example embodiment, overcomes problems with the prior art by limiting access to data on a remote computer to requests which contain a token, referred to herein as a "nonce" or "nonce code," that is only accepted for a limited number of requests. The nonce codes of the example embodiments allow only a one-time access to the data stored on a remote computer. Alternative embodiments may allow a limited number of accesses to data through the use of the same nonce value. The number of accesses which are allowed with the same nonce value is defined in the Service Level Agreement (SLA) entered into between the data or service provider and the entity paying for the access.

Figure 1:
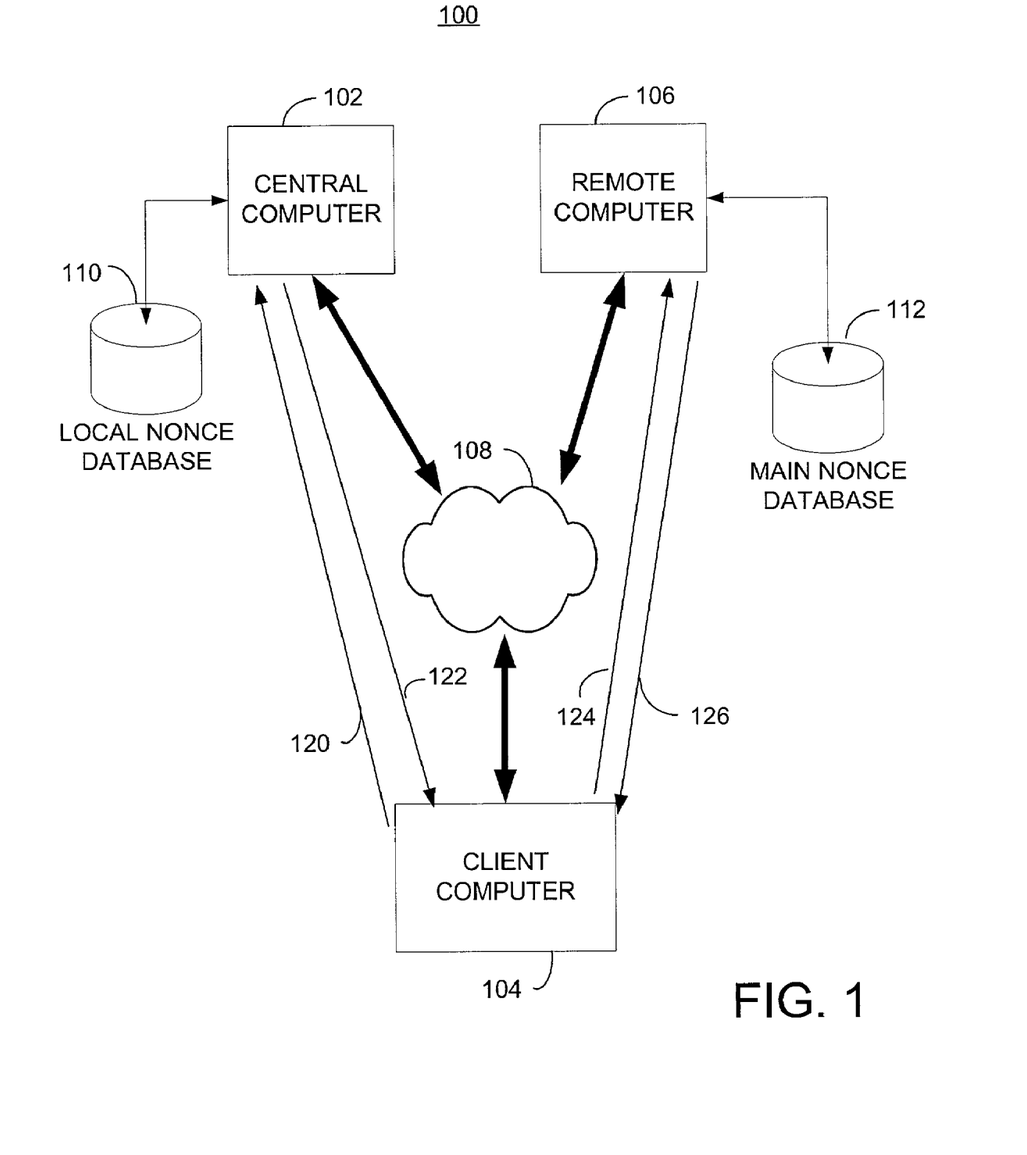
FIG. 1 is a block diagram illustrating a remote data access control system in accordance with an example embodiment of the present invention.

The nonce codes used by the first example embodiment of the present invention are large, cryptographically generated numbers which have limited times of validity as negotiated between the service provider and the application provider. The first example embodiment uses nonce codes that are pre-generated and shared between a service provider and application provider. In this specification, a service provider is an entity, which operates a computer that provides data in response to requests containing a valid nonce. An application provider, in this specification, is an entity, which operates computers that provide nonce codes to clients to allow retrieval of data from or execution of a process on a computer that is operated by a service provider. The data on the remote computer maintained by the service provider may be accessed by any computer which has a valid nonce. The illustrated embodiment of the present invention uses a central computer 102 to develop a display page using the HyperText Transfer Protocol (HTTP) to define information and provide a nonce to a client computer. The client computer may then access the data on the remote computer using the nonce to allow more timely access to the data presented to the user. The present invention may be used in any application where access is to be selectively provided to client computers, such as applications where a service provider provides distributed processing on a remote computer.

According to exemplary embodiments of the present invention, as shown in FIG. 1, a remote data access control system 100 consists of a remote computer 106, a central computer 102 and a client computer 104. These three computers are interconnected by a communications network, such as the Internet in the exemplary embodiments. Although only one of each computer is shown for clarity of illustration, the present invention supports a plurality of each of the computers shown, especially the client computer 104. The operation of the system is defined in detail below but is summarized here for illustration. A user on the client computer 104 requests information from the central computer 102 in request 120. The central computer 102 generates a representation of information to be displayed on the client computer 104, e.g. an HTML page, which is to be provided in response 122. Some of the information which is to be provided to the client computer 104 for this example information request 120 is actually maintained by remote computer 106. In order to provide the most recent information, and to reduce the processing requirements on central computer 102, the example embodiment of the present invention instructs the client computer 104 to directly request data from the remote computer 106.

The remote computer 106 restricts delivery of data to requests which include a nonce code as part of the request. In the example embodiment, the remote computer 106 maintains a main nonce database 112 which contains a specification of all nonce codes that are currently valid. Each nonce code represents a one-time only authorization to receive data and once a particular nonce code is used, it is no longer valid and therefore is no longer accepted by the remote computer 106. Each nonce is unique and may be associated with the entity which sends the nonce to the client. This association may be used to implement per-access billing for data provided by the remote computer 106.

In order to allow the client computer 104 to request data from the remote computer 106, the central computer 102 includes a specification of the remote computer 106 which allows the client computer 104 to communicate a data request 124 to the remote computer 106. The central computer 102 also includes in response 122, a nonce and a specification of the data to request from the remote computer 106. The central computer 102 of the first example embodiment maintains a local nonce database 110 which contains nonce codes that were received from the operator of the remote computer 106. The nonce codes stored in the local nonce database 110 are associated with the operator of the central computer 102 and may be used by the operator of the remote computer 106 to determine the entity which is authorizing access to the data maintained by the remote computer 106 in order to properly charge for the access.

Once the client computer 104 receives the response 122, the programming of the client computer 104 transmits a data request 124 to the remote computer 106. The data request 124 specifies the data requested, as defined by the response 122, and the nonce code. The remote computer 106 receives the data request 124 and if the nonce is valid, returns the requested data in the data response 126. The client computer 104 then receives the data response 126 and displays the complete set of requested information to the user.

The processing modules within the central computer 102 of the example embodiment include a communications processing component which performs the functions of a request message receiver and a partial response transmitter. The request message receiver receives the request message 120 and parses the data within the request message 120. The partial response transmitter of the example embodiments then formats and prepares for transmission the response message 122. The partial response transmitter includes in the response message 122 the HTML formatted data to create the information to be displayed, the proper nonce value to be used to request the information from a remote computer 106 and a specification of the remote computer 106 and data to be requested. In an example embodiment, described in detail below, the partial response transmitter digitally signs a portion of the response message 122 to provide authentication of the response. The central computer 102 of alternative embodiments may include a billing module to bill an entity for the data provided, such as the entity which requested the data by transmitting request 120.

The client computer 104 of the example embodiments includes a web browser which processes HTML, XML and SOAP formatted data contained in the messages exchanged between the client computer 104 and the central computer 102 as well as the client computer 104 and the remote computer 106. The web browser in the client computer 104 of the example embodiments performs the processing of the partial response receiver, which receives response message 122, processes the XML and other instructions in the response message 122, and determines the data to be transmitted to a remote computer 106. The web browser of the client computer 104 in the example embodiment also performs the request transmitter processing to format a data request message 124. Once the remote computer responds with a data response message 126, the web browser of the client computer 106 performs the processing of the service response receiver by processing the HTML and any other commands or data in the data response message 126. The service response receiver processing extracts the information in the response message 126 in order to display that information on the client computer.

Processing modules within the remote computer 106 of the example embodiments include modules which perform the processing associated with the request receiver, nonce verifier, response generator and the billing module. The communications processing module perform the processing for the request receiver by extracting an identification of the requested data and the nonce value from the data request message 124. The processing modules within the remote computer 106 perform the processing of the nonce verifier, which verifies the nonce value, and/or the nonce value's digital signature that is contained within the data request message 124 as described below. The communications processing modules contain within the remote computer 106 further perform the processing of the response generator by generating the data response message 126, as described below. The processing of the remote computer 106 in the example embodiments further incorporates a billing module, which charges an entity for the use of a nonce value. The entity which is charged is typically the operator of the central computer in the example embodiments, although Service Level Agreements (SLAs) may specify other entities to be billed.

The nonce values used by the first example embodiment are periodically communicated between the central computer 102 and the remote computer 106. The communication of the nonce values occurs at a rate defined by the Service Level Agreement (SLA) into which the operators of the remote computer 106 and the central computer 102 have entered. An example SLA may provide for new nonce codes to be communicated between the two computers every twenty-four hours. When values are communicated between the two computers at a specified rate, the time over which the nonce value is valid corresponds to the period between communications. In an example of nonce value communications occurring every twenty-four hours, the nonce values communicated are defined to be valid for a period of 24 hours or for a slightly longer time in order to accommodate usage at an the end of the validity period. Different values of time validity may be assigned to the nonce values to accommodate different application requirements.

The nonce values used in the first example embodiment are generated through the use of cryptologic techniques. Systems which use Nonce values that are generated by a conventional random number generator are vulnerable because a person could obtain a series of nonce values and determine the random number generation algorithm, thereby allowing that person to generate valid nonce values.

Figure 2:
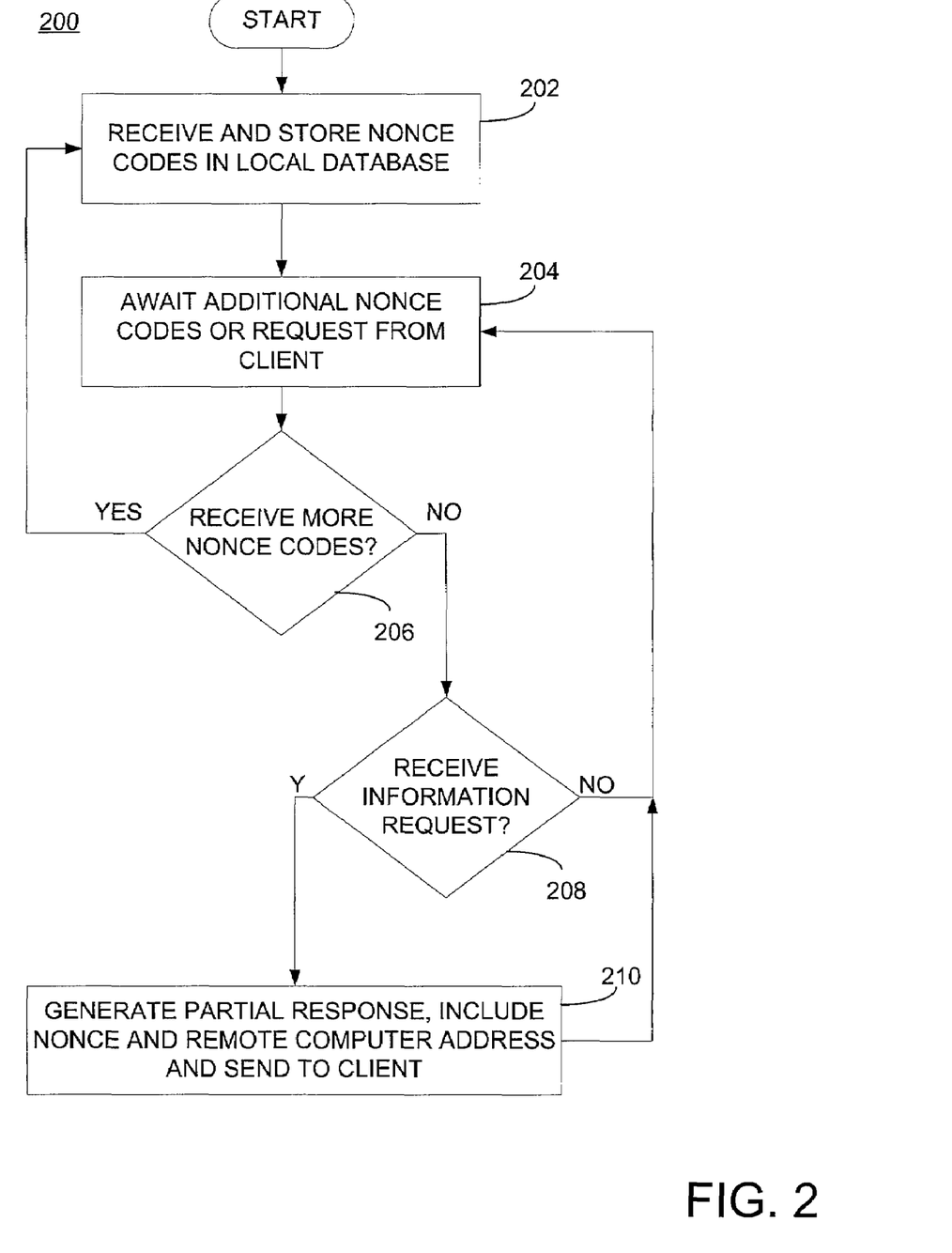
FIG. 2 is an operational flow diagram for assembling a response in a central computer that contains a nonce code according to an example embodiment of the present invention.

The central computer processing flow diagram 200 of the first example embodiment of the present invention is shown in FIG. 2. The processing in the central computer 102 beings, in step 202 wherein nonce codes which were generated in the remote computer 106 are transmitted to the central computer 102. The processing of step 202 includes storing the received nonce codes in the local nonce database 110.

After receipt of the nonce codes from the remote computer 106, the processing advances to step 204 wherein the processing awaits receipt of further nonce codes or a request from a client computer 104. Upon receipt of data, the processing advances to step 206 to determine if the data received are nonce codes. If the data received are nonce codes, processing returns to step 202 wherein the newly received codes are stored in the local nonce database 110. If the data received are not nonce codes, the processing advances to step 208 wherein the data is examined to determine if the data received is a request for information from a client computer 106. If the received data are not a request for information, processing is not performed on the data in this embodiment and the processing returns to step 204 to await additional data.

If the data is determined, in step 208, to be a request for information, the processing proceeds with step 210 wherein a partial set of information is assembled for transmission to the client computer 104. The information assembled also includes a specification of the remote computer 106 from which to request additional information. The exemplary embodiments use a URL associated with the remote computer 106 (e.g., http://ibm.com/../getDat?123) to specify the computer from which to request information. Alternative embodiments may use any suitable specification. The information assembled also includes a nonce which was retrieved from the local nonce database 110 and a specification of the information to request. The example embodiment includes the request to be transmitted to the remote computer 106. Alternative embodiments may include information which allows computation of the information to request. Once the information is assembled, it is sent to the client computer 104 which requested the information.

Once the client computer 104 receives the information from the central computer 102, the client computer 104 processes the information, determines that additional data must be requested from the remote computer 106 extracts the nonce and generates a data request 124 to send to the remote computer 106. Once the data request 124 is generated, the client computer 104 transmits the data request 124 to the remote computer 106.

Figure 3:
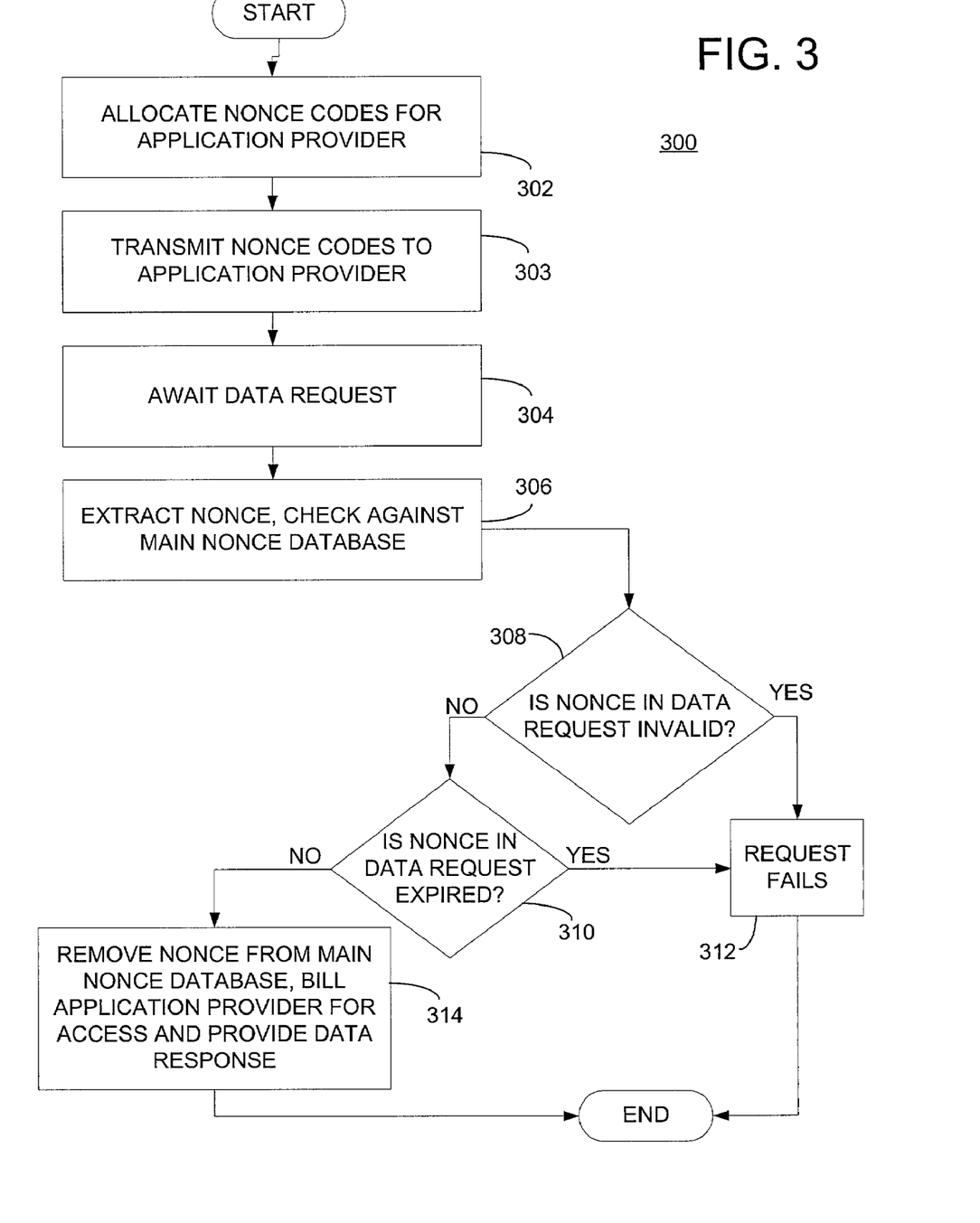
FIG. 3 is an operational flow diagram for controlling access to data on a remote computer according to an example embodiment of the present invention.

The remote computer processing flow diagram 300 of the first exemplary embodiment is illustrated in FIG. 3. The initial processing by the remote computer 106 includes generating, in step 302, a plurality of nonce codes to send to the application provider computers, including the central computer 102 of the first exemplary embodiment. The nonce codes that are generated are associated with the application provider to whom they are sent, which allows data requests that are received with those nonce codes to be associated with the appropriate application provider. After the remote computer 106 generates the nonce codes, the codes are stored in the main nonce database 112 and they are also sent to the application providers, including the central computer 102 in the first example embodiment, in step 303. The first example embodiment transmits the nonce codes to the central computer 102 via secure electronic communications, such as encrypted e-mail or other secure communications links such as HTTPS or SSL. The use of secure communications for the transmission of the nonce codes is desirable, but not strictly required, because non-secure transmissions may be vulnerable to interception and use by unauthorized parties. Other means may be used to communicate the nonce codes to the applications providers, as are known to practitioners in the relevant arts. After the nonce codes are transmitted to the applications providers, the processing suspends, in step 304, until a data request 124 is received from a client computer 104. Once a data request is received, the request is processed in step 306 to determine the requested data and to extract the nonce from the request 124.

The nonce received in data request 124 is examined to determine if it is valid. If the nonce is not stored in the main nonce database 112, it is assumed to be invalid. If the nonce is not valid, the request fails and the proper handling is performed in step 312. If the nonce is stored in the main nonce database 112, it is then examined, in step 310, to determine if it has expired. Each nonce in the first example embodiment is provided with an expiration time. This prevents a client saving a nonce and using it after the time span envisioned by the application provider. If the nonce has expired, as determined in step 310, the request fails and the failure processing of step 312 is performed. If the nonce has not expired as determined in step 310, processing advances to step 314 wherein the nonce is removed from the main nonce database 112, the accounting records of the service provider which operates the remote computer 106 are updated to reflect charges for the retrieved data and a data response 126 is generated and transmitted to the client computer 104.

Figure 4:
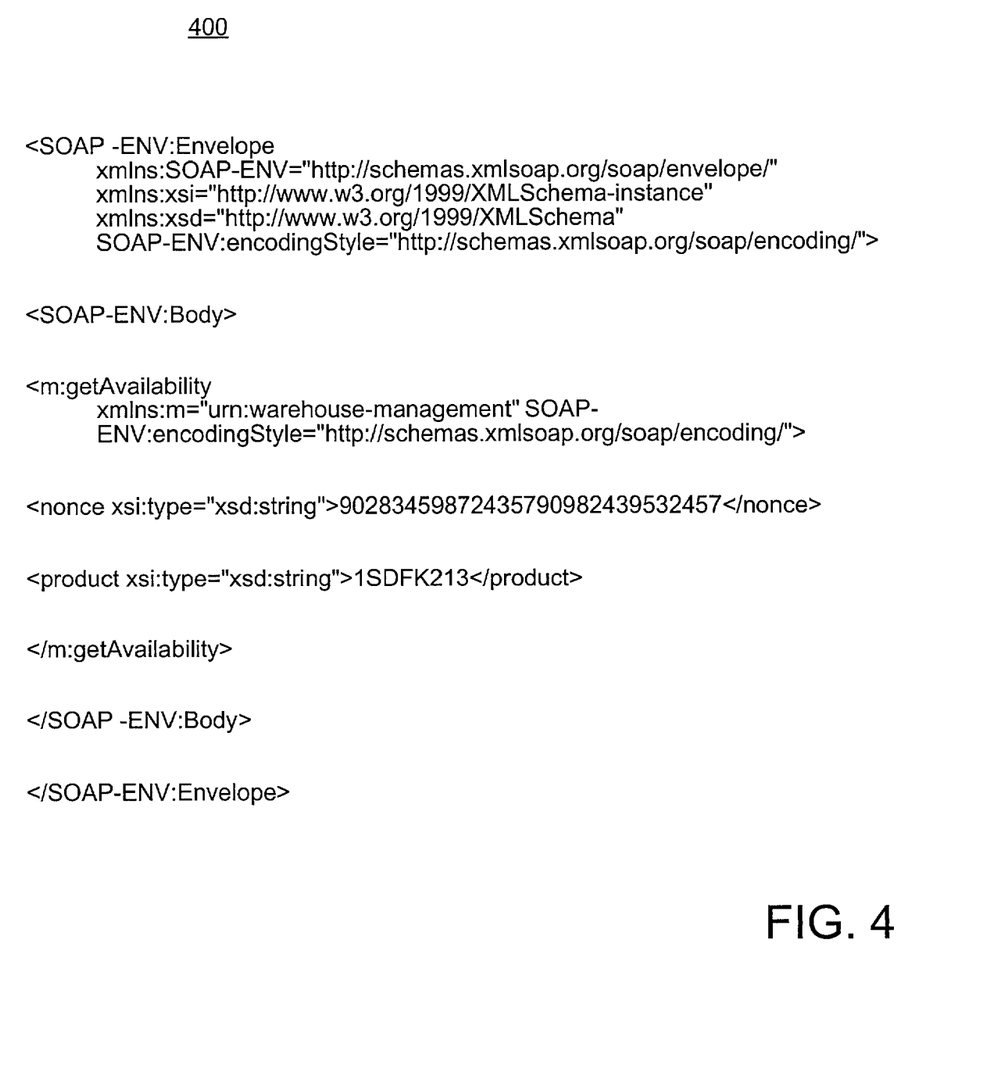
FIG. 4 is an example XML software code segment illustrating the processing performed by a client computer in requesting data from a remote computer which is directed by a central computer in an exemplary embodiment of the present invention.

The exemplary embodiments of the present invention use the SOAP (Simple Object Access Protocol) to format requests and responses that are communicated among the computers. SOAP is a standard protocol that allows requests for data objects to be defined in a uniform manner. An example HTTP code segment of a response 122 that contain a SOAP data request 400 that is sent from the central computer 102 to the client computer 104 is illustrated in FIG. 4. The SOAP data request 400 comprises JavaScript code and an XML data island. The XML Contains nonce values and other information. The example SOAP request 400 is based upon an example environment where the remote computer is operated by a product warehouse. In this environment the requested data is the number of a certain product which is an inventory. In this example the product identifier is included in the SOAP request and his indicated by the product ID 1SDFK213.

Upon receipt of the HTTP code containing the SOAP request, the HTML data is displayed to the user with a visual placeholder for the missing data. The JavaScript code runs as the page is loaded by the web browser operating in the client computer 104. The web browser reads the XML contained in the web page data and formulates the corresponding SOAP request. The web browser in the client computer 104 then issues a request to the remote computer over HTTP.

Figure 5:
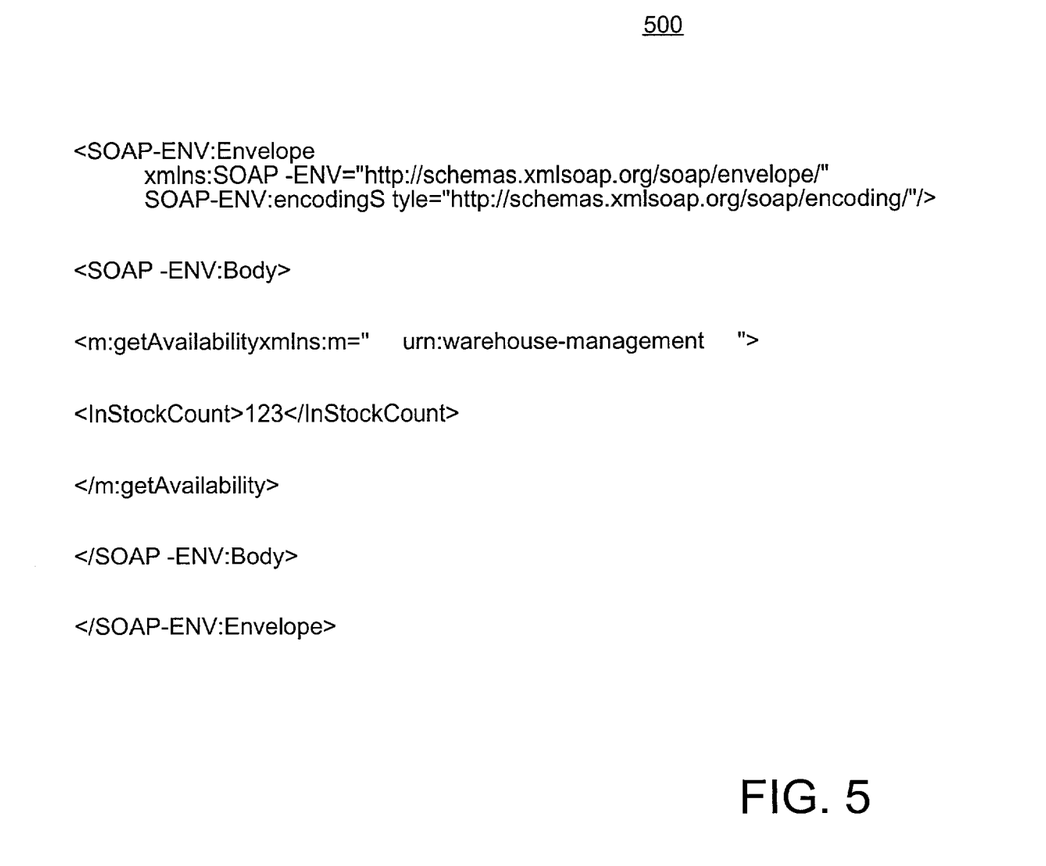
FIG. 5 is an example XML software code segment returned by a remote computer which contains information requested by the client computer in response to direction from a central computer.

An example SOAP response 500 contained in the data response 126 produced and communicated by the remote computer 105 is illustrated in FIG. 5. The SOAP response 500 contains the data "InStockCount" which is equal to 123 in this example. The web browser operating on the client computer 104 accepts the SOAP response, determines the value contained therein, and displays that value in the visual placeholder initially displayed upon interpretation of the response 122.

Figure 6:
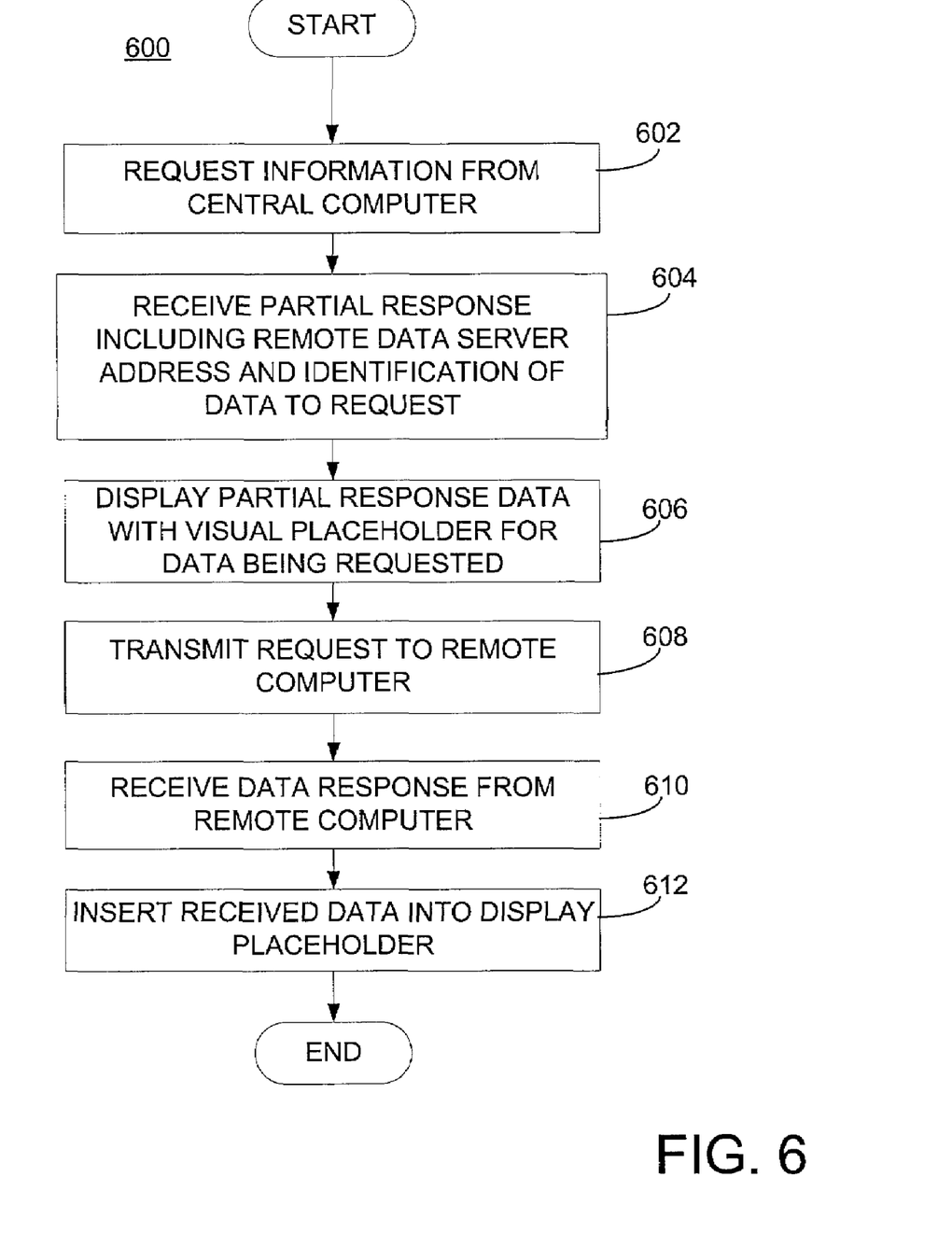
FIG. 6 is an operational flow diagram illustrating the processing performed by a client computer when receiving a partial set of information and requesting further information with a nonce value according to an exemplary embodiment of the present invention.

The client computer processing 600 that is performed by the client computer 104 in the exemplary embodiments is illustrated in FIG. 6. The client computer 104 initially requests information from the central computer 102 in step 602. The central computer 102 responds by a transmitting a partial response 122 to the client computer 104 that includes a specification of a remote computer 106 from which additional information is to be obtained as well as an identification of the data to request from the remote computer 106. The client computer receives that partial response in step 604. The data in the partial response 122 contains data to be displayed along with a visual placeholder to indicate the location where the data to be requested is to be displayed. The client computer 104 then transmits, in step 608, a request for the additional data to the remote computer 106. The client computer 104, in step 610, then receives the requested data in a response from the remote computer 106. Upon receipt of the requested data, the client computer 104 replaces, in step 612, the display placeholder generated in step 606 with the received data.

The first example embodiment of the present invention utilizes nonce codes, which are generated by the service provider, communicated to the application provider and stored in databases at both locations. Operation of the service provider computer, the remote computer 106, therefore only requires examination of the main nonce database 112 to determine if a received nonce is in the database and therefore valid. It is obvious that the present invention may work equally well with pre-generated nonce codes that are created through any practical means, such as on another computer or even by hand, and suitably communicated to so as to be stored at both the central computer 102 and remote computer 106 of the first example embodiment. Alternative embodiments may use cryptographic algorithms at the central computer 102 to generate nonce values that are pseudorandom sequences, which may be properly decrypted for validation at the remote computer 106, as is known to practitioners in the relevant arts.

An alternative embodiment of the present invention generates a complete data request message at the central computer 102 and sends it to the client computer 104. The data request message in this second example embodiment is generated at the central computer 102 and is digitally signed by the central computer 102 with a code unique to the application provider operating the central computer 102. The remote computer 106 of this second example embodiment only responds to data requests, which contain a recognized digital signature.

A second example embodiment of the present invention utilizes nonce values, which are generated by the application provider, either within the central computer 102 or in another processor, and then digitally sign the nonce values. This second example embodiment has the remote computer 106 using the application provider's public key in the digital signature to decrypt the nonce value, and each decrypted nonce value from the application provider is recognized only once. This prevents clients from reusing nonce values.

Figure 7:
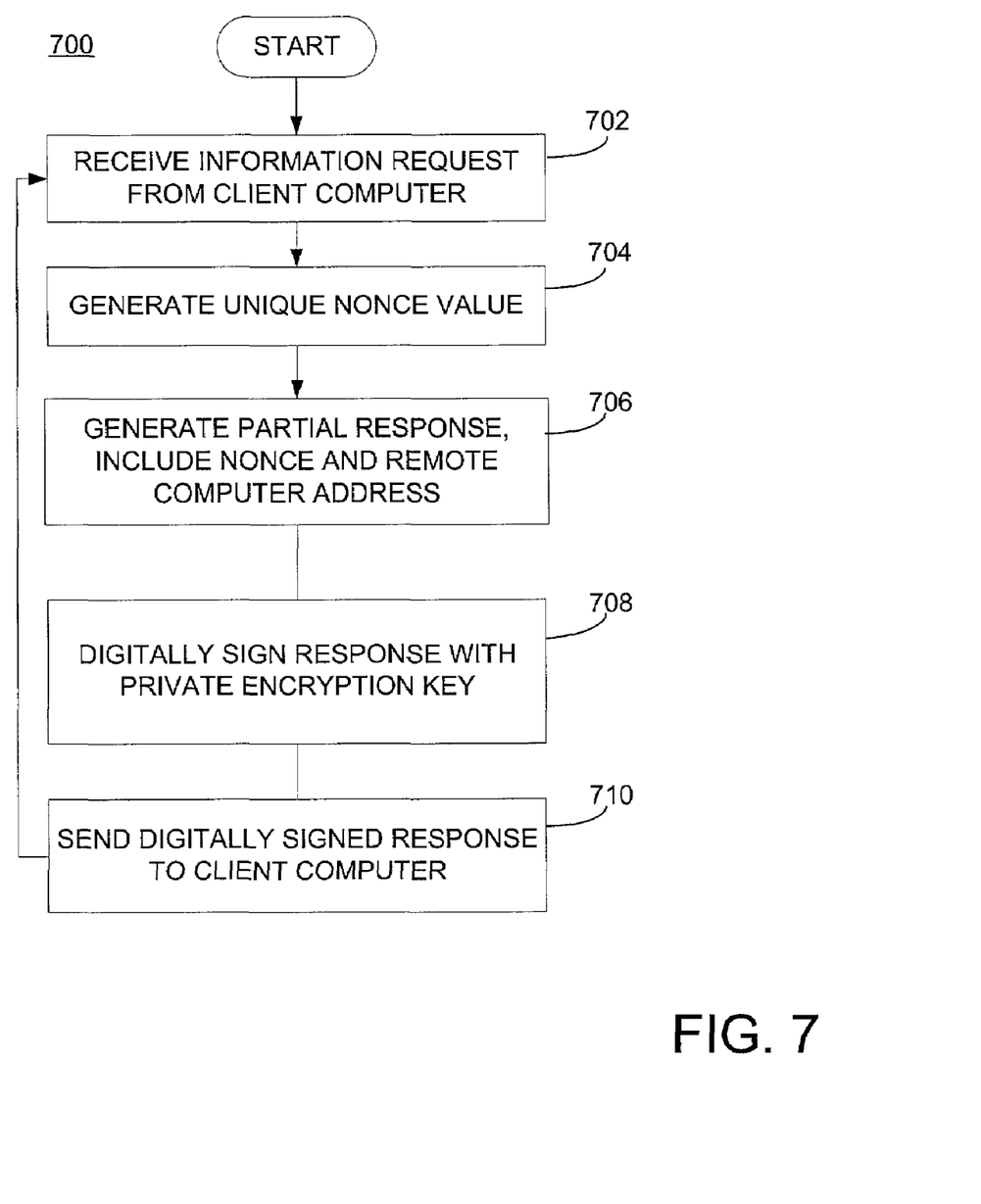
FIG. 7 is an operational flow diagram illustrating the processing performed by a central computer of an example embodiment of the present invention which uses self generated nonce codes that are digitally signed for transmission and validation on a remote computer.

The digital signature central computer processing flow 700 that is followed a central computer 102 of the second example embodiment is illustrated in FIG. 7. The digital signature central computer processing flow 700 begins with the receipt, in step 702, of an information request from a client computer 104. Upon receipt of the information request, the central computer generates, in step 704, a unique nonce value. The generated value may simply be the value of a counter, which is incremented for each received information request. Other embodiments may use different techniques to generate unique nonce values. The central computer 102 of the example embodiment then generates, in step 706, a partial response which includes a nonce value, a specification of a remote computer 106 from which to obtain additional data and a data request message that is to be transmitted to the remote computer 106. The specification provided in the partial response of the second example embodiment is the Internet address of the remote computer. The central computer, in step 708, then proceeds to digitally sign the nonce or data request message, that are contained within the generated response, with a private encryption key that is associated with the operator of the central computer 102. The private encryption key is defined by the SLA into which the operator of the central computer 102 and the operator of the remote computer had entered. The central computer 102 then transmits the response which contains the digitally signed secondary data request information to client computer 104.

Figure 8:
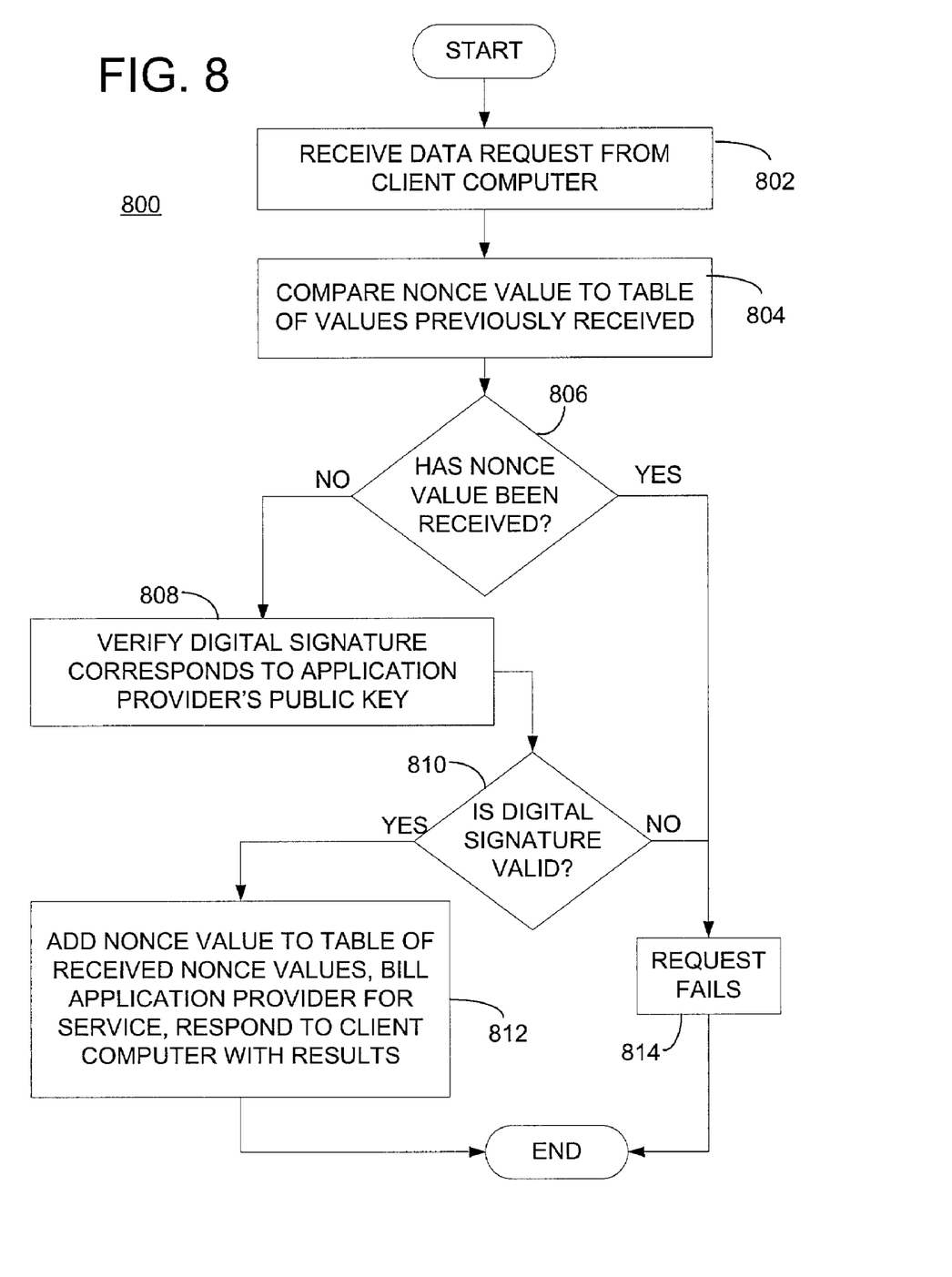
FIG. 8 is an operational flow diagram illustrating the processing performed by a remote computer of an example embodiment of the present invention in which central computers use digitally signed and self generated nonce codes.

The digitally signed remote computer processing flow 800 is illustrated in FIG. 8. The digitally signed remote computer processing flow 800 begins, in step 802, with receipt of a data requests from a client computer 104. The remote computer 106 compares the nonce value contained in the data request to the entries into a table of nonce values that have been previously received. The digitally signed remote computer processing only accepts a particular nonce value once. If the nonce value has been received, as is determined in step 806, the request fails and processing advances to step 814. The processing of step 814 may include transmission of an error message to the client computer 104, recording of the failed request, and other processing as selected by the operator of the remote computer 106 or as required under the service level agreement entered into by the operator of the central computer 102 and the remote computer 106. If the nonce value has not been previously received, as determined in step 806, processing advances to step 808, wherein the digital signature of the request is verified to insure that the digital signature corresponds to the public key associated with application provider, i.e. the public key associated with the operator of the central computer 102. If the digital signature is not verified, processing proceeds to step 814 and the request fails. If the digital signature is verified to be valid, processing advances to step 812, where the remote computer 106 adds the nonce value to the table of received nonce values, accounting records are updated to insure that the application provider is billed for the service provided by the remote computer 106, and a response message is generated and the transmitted to the client computer 104.

The present invention can be realized in hardware, software, or a combination of hardware and software. A system according to example embodiments of the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context mean any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method on a central computer of providing data to a client computer, comprising:
   accepting a request for data from a client computer; and
   transmitting, from a central computer, a partial response to the client computer, wherein the partial response comprises at least a nonce value and a representation of information to be displayed on the client computer, and wherein the nonce value is digitally signed by the central computer and is used to authorize a limited number of direct accesses to data on a remote computer, without using the central computer.

2. The method according to claim 1, further comprising the step of charging an entity upon use of the nonce value for at least one of the direct accesses.

3. The method according to claim 1, wherein the nonce value comprises an expiration time.

4. A method of controlling access to data on a remote computer, the method comprising:
   accepting a request for a data item from a client computer, wherein the request contains a nonce value which has been digitally signed with a digital signature by a central computer;
   verifying the nonce value, wherein the step of verifying the nonce value comprises the step of verifying the digital signature; and
   responding to the request by returning the data item directly to the client computer without using an intermediary central computer if the nonce value is valid and has been previously used fewer than a limited number of times.

5. The method according to claim 4, further comprising the step of charging an entity upon performance of the step of responding in conjunction with the use of the nonce value.

6. The method according to claim 4, wherein the nonce value comprises an expiration time.

7. The method according to claim 4, wherein step of verifying comprises comparing the nonce value to a list of stored and valid nonce values.

8. The method according to claim 7, wherein the list of stored and valid nonce values is shared with an entity that originated the data request.

9. A method on a client computer of obtaining service from a secure data server, the method comprising:

accepting a partial response from a first computer, wherein the partial response comprises at least a nonce value, a specification of a remote computer, and a representation of information to be displayed on a client computer accepting the partial response, and wherein the nonce value is signed with a digital signature from the first computer;

transmitting a service request to the remote computer, wherein the service request comprises the nonce value; and receiving a service response from directly the remote computer without the use of an intermediary central computer if the nonce value was valid.

10. The method according to claim 9, wherein the service request comprises one of a request for a data item and a request for a computing service.

11. A central computer system for providing data to a client computer, the system comprising:

a request message receiver for accepting a request for data from a client computer; and a partial response transmitter for transmitting a partial response by a central computer to the client computer, wherein the partial response comprises at least a nonce value and a representation of information to be displayed on the client computer, and wherein the nonce value is digitally signed by the central computer and is used to authorize a limited number of direct accesses to data on a remote computer, without using the central computer.

12. The system according to claim 11, further comprising a billing module for charging an entity upon use of the nonce value for at least one of the direct accesses.

13. The system according to claim 11, wherein the nonce value comprises an expiration time.

14. A system for controlling access to data on a computer, the system comprising:

a request receiver for accepting a request for a data item from a client computer, wherein the request contains a nonce value, wherein the nonce value is digitally signed with a digital signature by a central computer;

a nonce verifier for verifying the nonce value, wherein the nonce verifier performs at least a verification of the digital signature; and a response generator for responding to the request by returning the data item directly to the client computer without using an intermediary central computer if the nonce value is valid and has been previously used fewer than a limited number of times.

15. The system according to claim 14, further comprising a billing module for charging an entity upon use of the nonce value for the onetime access.

16. The system according to claim 14, wherein the nonce value comprises an expiration time.

17. A system for obtaining service from a secure data server, the system comprising:

a partial response receiver for accepting a partial response from a first computer, wherein the partial response comprises at least a nonce value, a specification of a remote computer, and a representation of information to be displayed on a client computer accepting the partial response, and wherein the nonce value is digitally signed with a digital signature by the first computer;

a request transmitter for transmitting a service request to the remote computer, wherein the service request comprises the nonce value; and a service response receiver for receiving a service response directly from the remote computer without the use of an intermediary central computer if the nonce value was valid.

18. The system according to claim 17, wherein the service request comprises a request for a data item.

19. A computer program product for controlling communications access to remote processors, the computer program product comprising:

a storage medium readable by a processing circuit and storing computer instructions for execution by the processing circuit for performing a method comprising:

accepting a request for data from a client computer; and transmitting a partial response, from a central computer, to the client computer, wherein the partial response comprises at least a nonce value and a representation of information to be displayed on the client computer, wherein the nonce value is digitally signed with a digital signature by the central computer and the nonce value is used to authorize a limited number of direct accesses to data on a remote computer, without using the central computer.

20. The computer program product of claim 19, further comprising instructions for charging an entity for at least one of the direct accesses.

21. The computer program product of claim 19, wherein the nonce value comprises an expiration time.

22. A computer program product for controlling communications access to computer, the computer program product comprising:

a storage medium readable by a processing circuit and storing computer instructions for execution by the processing circuit for performing a method comprising:

accepting a request for a data item from a client computer, wherein the request contains a nonce value, wherein the nonce value is digitally signed with a digital signature by a central computer;

verifying the nonce value, wherein the instructions for verifying comprise instructions for verifying the digital signature; and responding to the request by returning the data item directly to the client computer without using an intermediary central computer if the nonce value was verified by the instructions for verifying and the nonce value is valid and has been previously used fewer than a limited number of times.

23. The computer program product according to claim 22, further comprising instructions for charging an entity upon use of the nonce value for the onetime access.

24. The computer program product according to claim 22, wherein the nonce value comprises an expiration time.

25. A computer program product for obtaining service from a secure data server, the computer program product comprising:

a storage medium readable by a processing circuit and storing computer instructions for execution by the processing circuit for performing a method comprising:

accepting a partial response from a first computer, wherein the partial response comprises at least a nonce value, a specification of a remote computer, and a representation of information to be displayed on a client computer accepting the partial response, wherein the nonce value is digitally signed with a digital signature by the first computer;

transmitting a service request to the remote computer, wherein the service request comprises the nonce value; and receiving a service response from the remote computer without the use of an intermediary central computer if the nonce value was valid.

26. The computer program product according to claim 25, wherein the service request comprises a request for a data item.

* * * * *